L. LANGH.
TOOTH BRUSH.
APPLICATION FILED APR. 1, 1910.

969,639.

Patented Sept. 6, 1910.

Witnesses
J. M. Fowler Jr.
N. Weems

Inventor
Leopold Langh
By
Mason Fenwick Lawrence
Attorneys.

UNITED STATES PATENT OFFICE.

LEOPOLD LANGH, OF VIENNA, AUSTRIA-HUNGARY.

TOOTH-BRUSH.

969,639.      Specification of Letters Patent.      Patented Sept. 6, 1910.

Application filed April 1, 1910. Serial No. 552,776.

*To all whom it may concern:*

Be it known that I, LEOPOLD LANGH, a subject of the Emperor of Austria-Hungary, residing at No. 12 Wollzeile, Vienna, I, Austria-Hungary, have invented new and useful Improvements in Tooth-Brushes, of which the following is a specification.

The present invention relates to a rotary tooth-brush driven by a flexible shaft and consists in connecting the tubular casing, containing the flexible shaft, to the handle of the tooth-brush by means of two spring-plates of which one is in engagement by means of a stud with a guide slotway, whereby it is movable longitudinally.

The invention is illustrated on the accompanying drawing, in which:—

Figure 1:
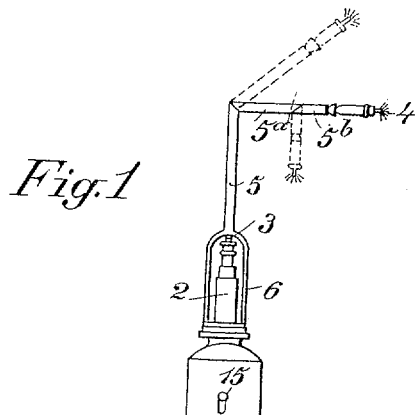
Figure 2:
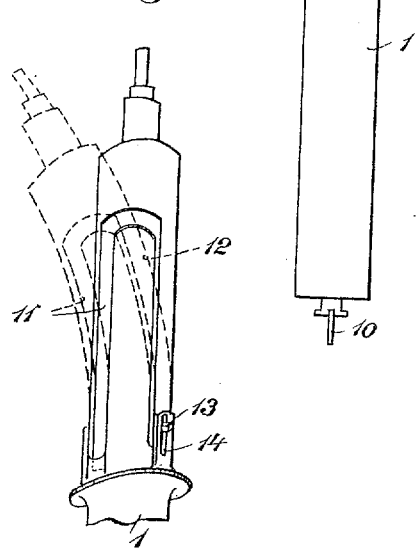

Figure 1, is an elevation, and Fig. 2, a view of a detail, drawn to a somewhat larger scale.

A suitably disposed mechanism, for example clock-work, not shown on the drawing, is arranged in the usual manner in the cylindrical casing 1, which serves the tooth-brush as a handle, and drives a spindle 2 situated coaxially with the cylinder 1, which spindle serves through the agency of a flexible shaft 3, to set an interchangeable tooth-brush head 4, in rapid rotation. The flexible shaft occupies as usual a tubular casing 5.

The capability of deviation of the tubular casing 5 is provided by forming the legs of the forked connection thereof with the casing 1, by two spring-plates 11 and 12, the latter of which is, according to the illustration movably and slidably connected by means of a stud 13 in a slotway 14, formed in a lug on the casing, so that the spring leg 12 is capable of limited displacement in the longitudinal direction whereby it is adapted to conform to the deformation caused by bending of the other leg 11.

With the rotary tooth-brush illustrated the user can reach even teeth difficult of access and clean them in an efficient manner.

I claim.

1. In a rotary tooth-brush, a brush head, a flexible shaft for driving said head, a tubular casing surrounding said shaft, a casing inclosing mechanism for driving said shaft, a bifurcated spring connection between said tubular casing and said inclosing casing and means for permitting limited longitudinal movement of one member of said bifurcated spring connection.

2. In a rotary tooth brush, a brush head, a flexible shaft for driving said head, a tubular casing surrounding said shaft, a motor for driving said shaft, a casing for said motor having a lug, a bifurcated spring connection between said tubular casing and said motor casing, one leg of which stops short of the motor casing, and a stud on said leg in engagement with a slotway formed in said lug on said casing.

In testimony whereof I have signed my name to this specification in the presence of two subscribing witnesses.

LEOPOLD LANGH.

Witnesses:
     FREDERICK ACHENBACH,
     AUGUST FUGGER.